(12) United States Patent  
Sasaoka

(10) Patent No.: US 7,197,242 B2
(45) Date of Patent: Mar. 27, 2007

(54) CHROMATIC-DISPERSION MEASURING APPARATUS AND METHOD

(75) Inventor: Eisuke Sasaoka, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 754 days.

(21) Appl. No.: 10/162,590

(22) Filed: Jun. 6, 2002

(65) Prior Publication Data

US 2002/0186437 A1     Dec. 12, 2002

(30) Foreign Application Priority Data

Jun. 8, 2001     (JP)     ............... 2001-174471

(51) Int. Cl.
*H04B 10/00*     (2006.01)
(52) U.S. Cl. .......................... 398/29; 398/28
(58) Field of Classification Search ............. 398/25, 398/28–29; 356/73.1
See application file for complete search history.

(56) References Cited

U.S. PATENT DOCUMENTS

| | | | | |
|---|---|---|---|---|
| 4,102,661 A | * | 7/1978 | Dudderar et al. | 65/378 |
| 4,181,433 A | * | 1/1980 | Marcuse | 356/73.1 |
| 4,984,884 A | * | 1/1991 | Ryu et al. | 356/73.1 |
| 5,406,368 A | | 4/1995 | Horiuchi et al. | |
| 5,969,806 A | * | 10/1999 | Bergano | 356/73.1 |
| 6,879,386 B2 | * | 4/2005 | Shurgalin et al. | 356/73.1 |

FOREIGN PATENT DOCUMENTS

| | | |
|---|---|---|
| EP | 0 342 847 A | 11/1989 |
| EP | 0 582 831 A1 | 2/1994 |
| JP | 6-140136 A | 7/1985 |

OTHER PUBLICATIONS

Giovanni Cancellieri, *Single-Mode Optical Fiber Measurement: Characterization and Sensing*, Artech House, Boston, 1993, Chapter 3, pp. 139-144.

* cited by examiner

*Primary Examiner*—Agustin Bello
(74) *Attorney, Agent, or Firm*—McDermott Will & Emery LLP

(57) ABSTRACT

The present invention provides a chromatic-dispersion measuring apparatus and method that can quickly measure chromatic dispersion in an optical fiber even when the optical fiber is short. Continuous light beams having the wavelengths $\lambda_1$ and $\lambda_2$ output from light sources are multiplexed by a multiplexer, are intensity-modulated by an intensity modulator, and are then output as optical signals. The output optical signals with the wavelengths $\lambda_1$ and $\lambda_2$ enter an optical fiber to be measured, and propagate therethrough. The optical signals emerging from the optical fiber are de-multiplexed by a de-multiplexer, and are received by corresponding photodetectors. Subsequently, the phase difference between the optical signals received by the photodetectors is detected by a phase detector. The chromatic dispersion of the optical fiber is calculated by an arithmetical circuitry on the basis of the detection result.

3 Claims, 4 Drawing Sheets

CHROMATIC-DISPERSION MEASURING APPARATUS AND METHOD

BACKGROUND OF THE INVENTION

1. Field of the Invention

The present invention relates to an apparatus and method for measuring chromatic dispersion in an optical fiber.

2. Description of the Related Art

Single-mode optical fibers in which chromatic dispersion is zero around the wavelength of 1.3 μm and is approximately 17 ps/nm/km around the wavelength of 1.55 μm, dispersion-compensating optical fibers in which chromatic dispersion is negative around the wavelength of 1.55 μm, and dispersion-shifted optical fibers in which the zero dispersion wavelength is shifted from the wavelength of 1.3 μm toward the longer wavelength side have been used thus far as optical fiber transmission media in optical communication systems. A dispersion-managed optical fiber is also under consideration in which chromatic dispersion varies, having an opposite sign alternately in the longitudinal direction at the wavelength of 1.55. Known methods for measuring chromatic dispersion in an optical fiber are a pulse delay method, a phase shift method, and an interferometric method (Giovanni Cancellieri, *Single-Mode Optical Fiber Measurement: Characterization and Sensing* (Artech House, Boston, 1993), chap 3, pp. 139–144).

If chromatic dispersion in an optical fiber can be measured by in-line measurement during a manufacturing process in which the optical fiber is drawn from an optical fiber preform, it is possible to make the optical fiber to have a designed chromatic dispersion by controlling the drawing conditions (for example, the drawing speed, the optical-fiber-preform feeding speed, and the drawing-furnace temperature) on the basis of the result of such measurement. However, none of the above methods can be applied to the in-line measurement.

That is, in the pulse delay method, an optical fiber having a length of 0.5 km or more is necessary for measurement. In the phase shift method, it is necessary to measure the amount of phase shift of each of the optical signals having different wavelengths that are made to enter an optical fiber to be measured, and this increases the measurement time. In the interferometric method, it is necessary to measure interference signals while adjusting the difference in optical path length between two optical paths in an interferometer, and thus the measurement consumes considerable time. For this reason, it is difficult to perform in-line measurement using the above methods.

SUMMARY OF THE INVENTION

Accordingly, it is an object of the present invention to provide a chromatic-dispersion measuring apparatus and method that can quickly measure the chromatic dispersion of an short optical fiber and that is suitable for in-line chromatic-dispersion measurement.

In order to achieve this object, there is provided a chromatic-dispersion measuring apparatus including a light source unit for outputting intensity-modulated optical signals having a plurality of different wavelengths and for causing the optical signals to simultaneously enter an optical fiber to be measured, a de-multiplexer for de-multiplexing the optical signals output from the optical fiber, a photodetector for receiving the optical signals de-multiplexed by the de-multiplexer, a phase detector for detecting the phase difference between the received optical signals, and an arithmetical circuitry for calculating chromatic dispersion in the optical fiber on the basis of the phase difference.

There is also provided a chromatic-dispersion measuring method including the steps of causing intensity-modulated optical signals having a plurality of different wavelengths to simultaneously enter an optical fiber to be measured, de-multiplexing the optical signals output from the optical fiber, receiving the optical signals, detecting the phase difference between the optical signals, and measuring chromatic dispersion in the optical fiber on the basis of the detection result.

In the chromatic-dispersion measuring method of the present invention, optical signals may be caused to enter an optical fiber to be measured from an upper end of an optical fiber preform and to pass through the optical fiber preform while the optical fiber is being drawn from the optical fiber preform, or may be caused to enter the optical fiber from the side face of the optical fiber. On the other hand, the optical signals emerging from the side face of the optical fiber may be received after being de-multiplexed.

The present invention is further explained below by referring to the accompanying drawings. The drawings are provided solely for the purpose of illustration and are not intended to limit the scope of the invention.

DESCRIPTION OF THE PREFERRED EMBODIMENTS

Figure 1:
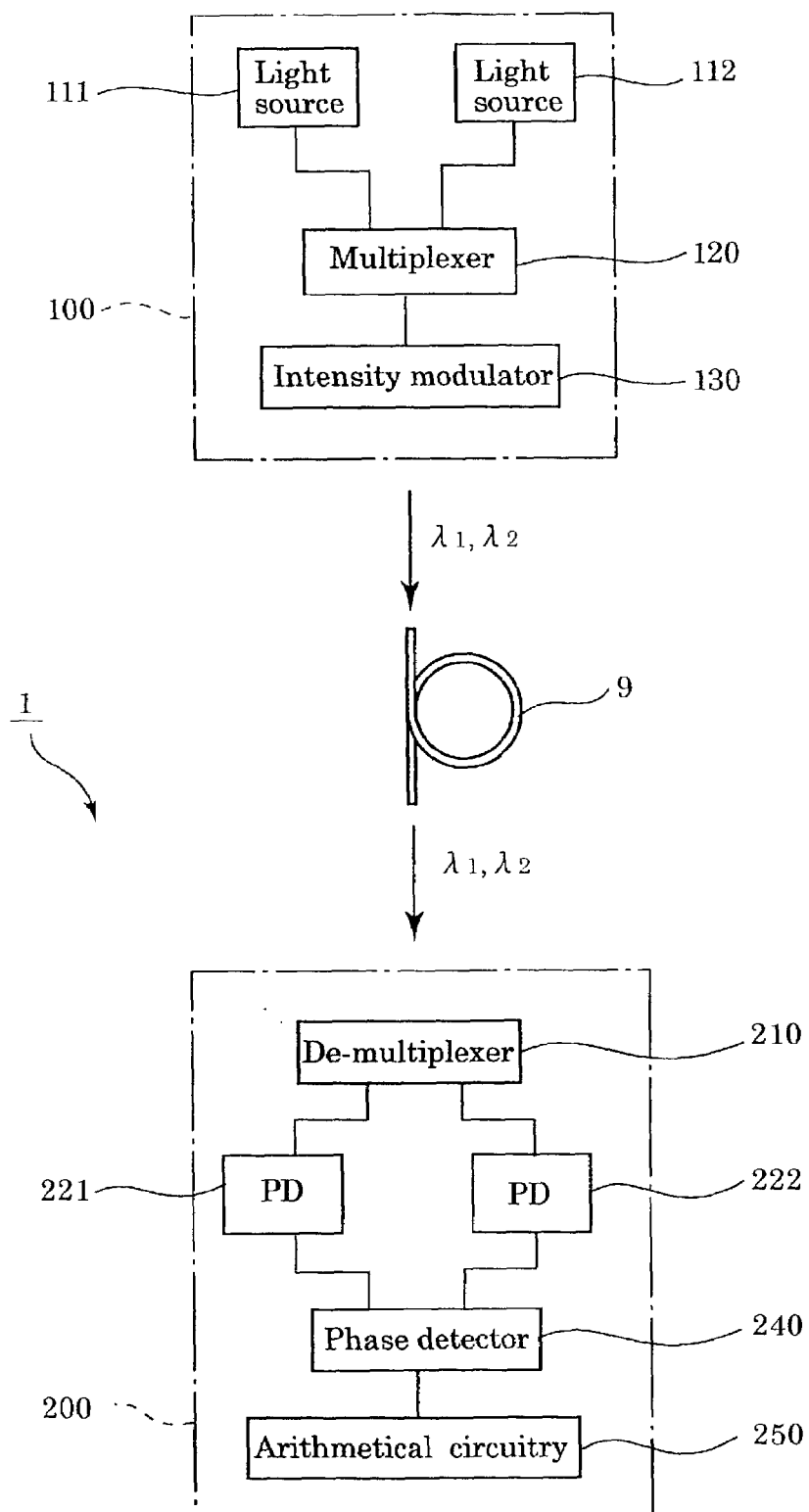
FIG. 1 is a schematic diagram showing a structure of a chromatic-dispersion measuring apparatus according to a first embodiment of the present invention.

Embodiments of the present invention are explained below by referring to the accompanying drawings. In the drawings, the same number refers to the same part to avoid duplicate explanation. The ratios of the dimensions in the drawings do not necessarily coincide with the explanation.

[First Embodiment]

First, a chromatic-dispersion measuring apparatus and method according to a first embodiment of the present invention will be described. FIG. 1 is a schematic diagram showing a structure of a chromatic-dispersion measuring apparatus 1 of the first embodiment. The chromatic-dispersion measuring apparatus 1 comprises a light source unit 100 and a phase detector unit 200, and serves to measure the chromatic dispersion of an optical fiber 9.

The light source unit 100 includes light sources 111 and 112, a multiplexer 120, and an intensity modulator 130. The light sources 111 and 112 output continuous light beams having different wavelengths $\lambda_1$ and $\lambda_2$, respectively. The wavelengths $\lambda_1$ and $\lambda_2$ serve as measuring wavelengths, for example, around 1.55 μm, for measuring the chromatic dispersion of the optical fiber 9. The multiplexer 120 multiplexes the two light beams, and outputs the multiplexed light beams to the intensity modulator 130. The intensity modulator 130 subjects both multiplexed light beams having the wavelengths $\lambda_1$ and $\lambda_2$ to intensity modulation with a predetermined period, and outputs the light beams as optical signals. The optical signals that are output from the intensity modulator 130 enter simultaneously the optical fiber 9 to be measured.

The phase detector unit 200 includes a de-multiplexer 210, photodetectors 221 and 222, a phase detector 240, and an arithmetical circuitry 250. The de-multiplexer 210 receives and de-multiplexes the optical signals having the wavelengths $\lambda_1$ and $\lambda_2$ emerging from the optical fiber 9, outputs the optical signal with the wavelength $\lambda_1$ to the photodetector 221, and outputs the optical signal with the wavelength $\lambda_2$ to the photodetector 222. The photodetectors 221 and 222 receive the optical signals having the wavelengths $\lambda_1$ and $\lambda_2$, respectively, and output electrical signals in accordance with the intensities of the optical signals.

The phase detector 240 detects a phase difference between the electrical signals output from the photodetectors 221 and 222, and thereby detects a phase difference $\Delta\phi$ between the optical signals having the wavelengths $\lambda_1$ and $\lambda_2$. The arithmetical circuitry 250 calculates the chromatic dispersion D of the optical fiber 9 on the basis of the phase difference $\Delta\phi$, the difference $\Delta\lambda$ between the wavelengths $\lambda_1$ and $\lambda_2$, the period T of intensity modulation, and the length L of the optical fiber 9. The chromatic dispersion D of the optical fiber 9 is given by the following formula:

$$D=\Delta\phi\cdot T/(2\pi\cdot\Delta\lambda\cdot L) \quad (1)$$

Next, the operation of the chromatic-dispersion measuring apparatus 1 and a chromatic-dispersion measuring method according to the first embodiment will be described. The chromatic-dispersion measuring method is adopted to measure the chromatic dispersion of the optical fiber 9 using the chromatic-dispersion measuring apparatus. In the light source unit 100, continuous light beams having the wavelengths $\lambda_1$ and $\lambda_2$ output from the light sources 111 and 112 are multiplexed by the multiplexer 120, are subjected to intensity modulation with a predetermined period by the intensity modulator 130, and are then output as optical signals to the optical fiber 9 to be measured. The optical signals having the wavelengths $\lambda_1$ and $\lambda_2$ output from the light source unit 100 propagate through the optical fiber 9, and enter the phase detector unit 200.

In the phase detector unit 200, the optical signals having the wavelengths $\lambda_1$ and $\lambda_2$ output from the optical fiber 9 are de-multiplexed by the de-multiplexer 210. Subsequently, the optical signal with the wavelength $\lambda_1$ is received by the photodetector 221, and the optical signal with the wavelength $\lambda_2$ is received by the photodetector 222. The phase difference between the optical signals having the wavelengths $\lambda_1$ and $\lambda_2$ is detected by the phase detector 240. The chromatic dispersion of the optical fiber 9 between the optical-signal incident position and the optical-signal emergent position is calculated by the arithmetical circuitry 250 on the basis of the detected phase difference.

In this way, the configuration of the light source unit 100 is simple in this embodiment. Moreover, since the chromatic dispersion of the optical fiber 9 is measured on the basis of the phase difference between the optical signals having the wavelengths $\lambda_1$ and $\lambda_2$ after the optical signals propagate through the optical fiber 9, it can be quickly measured even when the optical fiber 9 is short.

Figure 2:
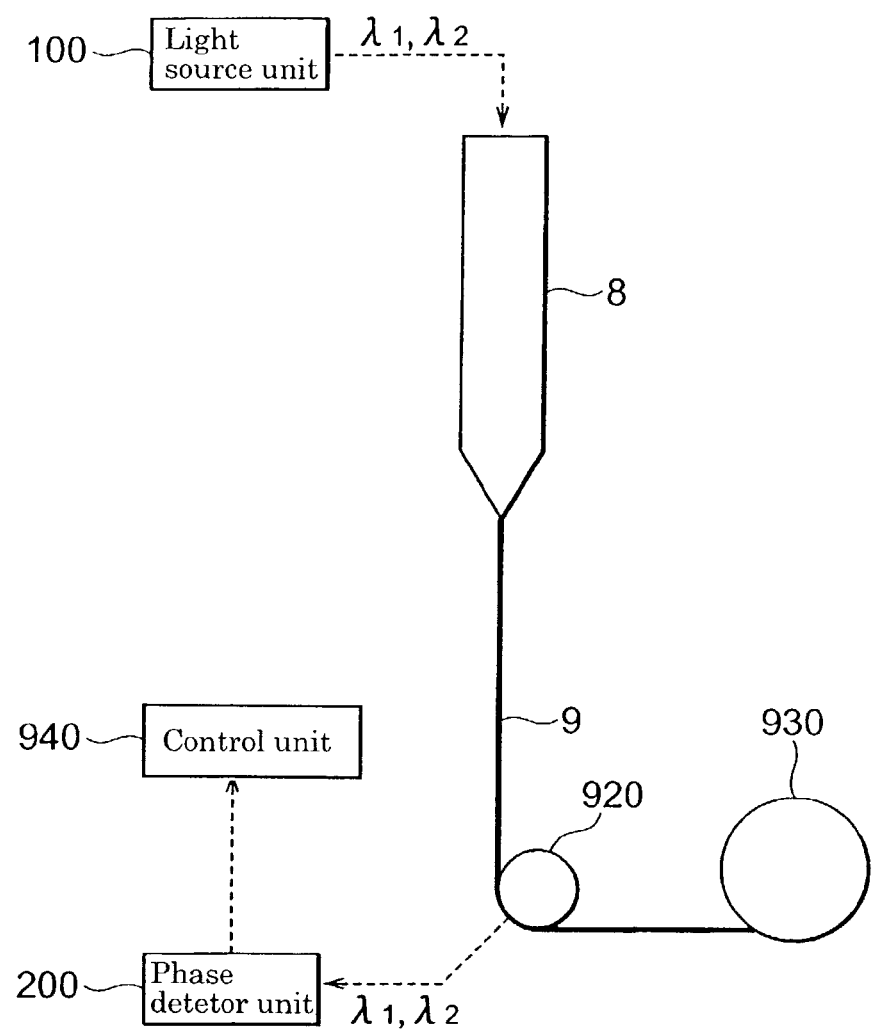
FIG. 2 is an explanatory view showing the in-line measurement using the chromatic-dispersion measuring apparatus and method according to the first embodiment.

A description will now be given of the in-line measurement using the chromatic-dispersion measuring apparatus 1 and the chromatic-dispersion measuring method according to the first embodiment with reference to FIG. 2. As shown in this figure, an optical fiber 9 (to be measured) obtained by drawing an optical fiber preform 8 is wound around a bobbin 930 via a roller 920. The drawing conditions (for example, the drawing speed, the optical-fiber-preform feeding speed, and the drawing-furnace temperature) are controlled by a control unit 940.

Optical signals having the wavelengths $\lambda_1$ and $\lambda_2$ are output from the light source unit 100 after being intensity-modulated, enter a core portion of an upper-end of the optical fiber preform 8, and propagate through the optical fiber 9 via the optical fiber preform 8. Since the optical fiber 9 is bent by the roller 920 disposed at the bottom of a drawing tower, the optical signals propagating therethrough partially leak through the side face of the optical fiber 9 at the bent portion. The leaking optical signals having the wavelengths $\lambda_1$ and $\lambda_2$ enter the phase detector unit 200 so that a phase difference therebetween is detected. While the phase difference in the optical fiber 9 including the optical fiber preform 8 is measured in this embodiment, the chromatic dispersion of the optical fiber 9 between the bottom position of the optical fiber preform 8 where the optical fiber preform 8 is thinned to a predetermined fiber diameter, and the optical-signal emergent position (where the optical fiber 9 is brought into contact with the roller 920) can be measured, for example, by measuring the phase difference in the optical fiber preform 8 beforehand and then subtracting the detected phase difference from the phase difference determined by the method of this embodiment.

The drawing conditions are controlled by the control unit 940 on the basis of the obtained chromatic dispersion. As a result, an optical fiber that provides a designed chromatic dispersion can be manufactured. In this way, since the chromatic-dispersion measuring apparatus 1 and the chromatic-dispersion measuring method of the first embodiment allow speedy measurement of chromatic dispersion even when the optical fiber to be measured is short, they are suitable for in-line measurement. Inputting optical signals having different wavelengths to the optical fiber to be measured from the upper end of the optical fiber preform enhances the input efficiency of the optical signals.

[Second Embodiment]

Figure 3:
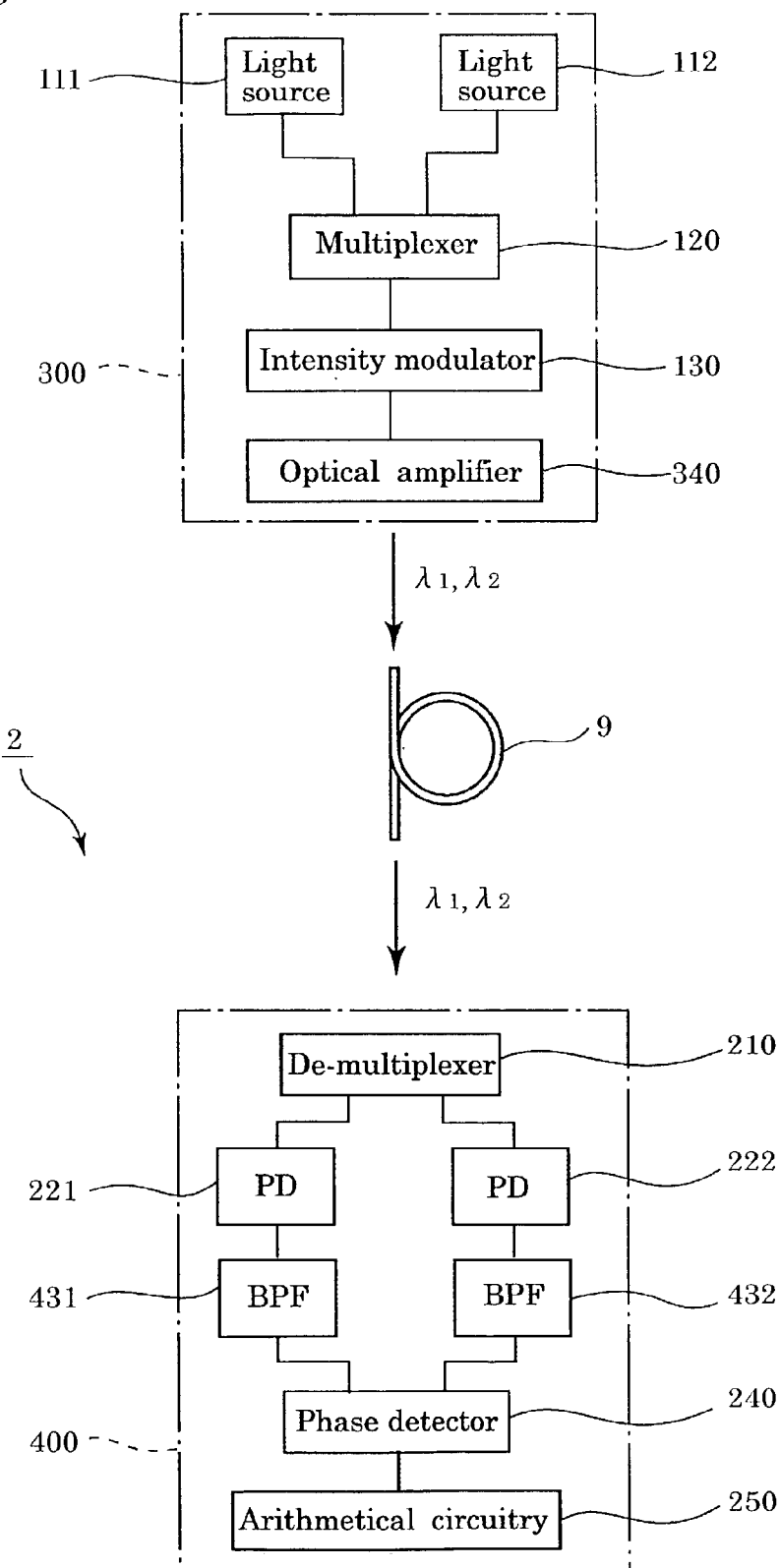
FIG. 3 is a schematic diagram showing a structure of a chromatic-dispersion measuring apparatus according to a second embodiment of the present invention.

A chromatic-dispersion measuring apparatus and method according to a second embodiment of the present invention will be described below. FIG. 3 is a schematic diagram showing a structure of a chromatic-dispersion measuring apparatus 2 of the second embodiment. The chromatic-dispersion measuring apparatus 2 comprises a light source unit 300 and a phase detector unit 400, and serves to measure the chromatic dispersion of an optical fiber 9.

In the light source unit 300, an optical amplifier 340 is placed subsequent to an intensity modulator 130. The optical amplifier 340 optically amplifies light beams having the wavelengths $\lambda_1$ and $\lambda_2$ intensity-modulated by the intensity modulator 130, and outputs the optically amplified light beams as optical signals. The optical signals with the wavelengths $\lambda_1$ and $\lambda_2$ output from the optical amplifier 340 enter simultaneously the optical fiber 9 to be measured.

In the phase detector unit 400, bandpass filters 431 and 432 are disposed between photodetectors 221 and 222 and a phase detector 240. The bandpass filters 431 and 432 receive the electrical signals output from the photodetectors 221 and 222, respectively, and selectively output a frequency component of the intensity modulation by the intensity modulator 130. The phase detector 240 detects a phase difference between the electrical signals output from the bandpass filters 431 and 432, and thereby detects a phase difference between the optical signals with the wavelengths $\lambda_1$ and $\lambda_2$.

Next, the operation of the chromatic-dispersion measuring apparatus 2 will be described, and a method for measuring the chromatic dispersion of the optical fiber 9 by using the chromatic-dispersion measuring apparatus 2 will also be described. Continuous light beams having the wavelengths $\lambda_1$ and $\lambda_2$ output from light sources 111 and 112 are multiplexed by a multiplexer 120, are subjected to intensity modulation by the intensity modulator 130 with a predetermined period, are optically amplified by the optical amplifier 340, and are then output as optical signals. The optical signals with the wavelengths $\lambda_1$ and $\lambda_2$ output from the light source unit 300 enter the optical fiber 9, propagate therethrough, and enter the phase detector unit 400.

In the phase detector unit 400, the optical signals having the wavelengths of $\lambda_1$ and $\lambda_2$ are de-multiplexed by a de-multiplexer 210. The optical signal of $\lambda_1$ is received by the photodetector 221, and the optical signal of $\lambda_2$ is received by the photodetector 222. An intensity-modulation frequency component of an electrical signal output from the photodetector 221 passes through the bandpass filter 431, and enters the photodetector 240. An intensity-modulation frequency component of an electrical signal output from the photodetector 222 passes through the bandpass filter 432, and enters the phase detector 240. The phase detector 240 detects a phase difference between the optical signals having the wavelengths $\lambda_1$ and $\lambda_2$. An arithmetical circuitry 250 calculates the chromatic dispersion of the optical fiber between the optical-signal incident position and the optical-signal emergent position on the basis of the detected phase difference.

As described above, in this embodiment, since the chromatic dispersion of the optical fiber 9 is also measured on the basis of the phase difference between the optical signals having the wavelengths $\lambda_1$ and $\lambda_2$ after the optical signals propagate through the optical fiber 9, it can quickly be measured even when the optical fiber 9 is short. In particular, since the light source unit 300 includes the optical amplifier 340 so as to increase the power of the optical signals output from the light source unit 300, this embodiment is suitable for use in a case in which the input efficiency of the optical signals to the optical fiber 9 is low or in a case in which the output efficiency of the optical signals from the optical fiber 9 is low. Further, since only the intensity-modulation frequency components are extracted by the bandpass filters 431 and 432, the signal to noise ratio of the electrical signals can be increased, and high-precision phase difference measurement (that is, high-precision chromatic-dispersion measurement) is possible.

Figure 4:
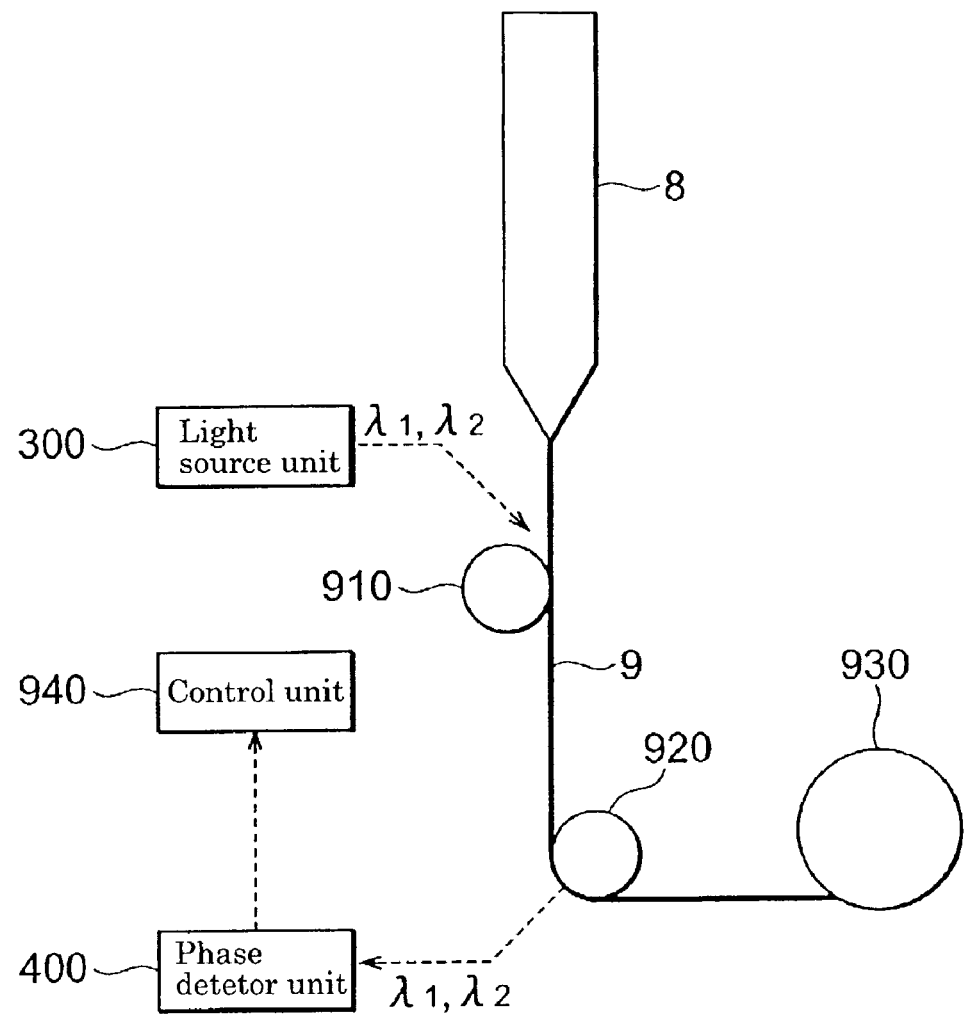
FIG. 4 is an explanatory view showing the in-line measurement using the chromatic-dispersion measuring apparatus and method according to the second embodiment.

A description will now be given of the in-line measurement using the chromatic-dispersion measuring apparatus 2 and the chromatic-dispersion measuring method according to the second embodiment with reference to FIG. 4. As shown in this figure, an optical fiber 9 (to be measured), which is obtained by drawing an optical fiber preform 8, is wound around a bobbin 930 via rollers 910 and 920. The drawing conditions (for example, the drawing speed, the optical-fiber-preform feeding speed, and the drawing-furnace temperature) are controlled by a control unit 940. Optical signals having the wavelengths $\lambda_1$ and $\lambda_2$ subjected to intensity modulation are output from the light source unit 300, enter the optical fiber 9 from the side face of a portion of the optical fiber 9 in contact with the roller 910, and propagate through the optical fiber 9. Since the optical fiber 9 is bent by the roller 920 disposed at the bottom of a drawing tower, the optical signals propagating through the optical fiber 9 partially leak from the side face at the bent portion. The leaking optical signals with the wavelengths $\lambda_1$ and $\lambda_2$ enter the phase detector unit 400 so that a phase difference therebetween is detected. The chromatic dispersion of the optical fiber 9 between the optical-signal incident position (the position in contact with the roller 910) and the optical-signal emergent position (the position in contact with the roller 920) is determined on the basis of the detected phase difference. The drawing conditions are controlled by the control unit 940 on the basis of the determined chromatic dispersion. As a result, an optical fiber that provides a designed chromatic dispersion can be manufactured. In this way, since the chromatic-dispersion measuring apparatus 2 and the chromatic-dispersion measuring method of the second embodiment allow the chromatic dispersion to be measured quickly even when the optical fiber to be measured is short, they are suitable for in-line measurement. Since the light source unit 300 includes the optical amplifier 340 that increases the power of the optical signals output from the light source unit 300, the chromatic dispersion can be measured by in-line measurement even when the input efficiency of the optical signals is low, for example, when the optical signals enter the optical fiber 9 from the side face thereof. Further, since only the intensity-modulation frequency components are extracted by the bandpass filters 431 and 432, the signal to noise ratio of the electrical signals can be increased, and high-precision phase-difference measurement (that is, high-precision chromatic-dispersion measurement) is possible.

By the method in which optical signals having different wavelengths are caused to enter into a side face of the optical fiber which is to be measured and the optical signals that emerge from a side face of the optical fiber are de-multiplexed and received, it is possible to measure the chromatic dispersion at a specific region in the longitudinal direction of the optical fiber.

[Modifications]

The present invention is not limited to the above embodiments, and various modifications are possible. For example, more than three light sources which output light beams having different wavelengths respectively may be used. In the in-line measurement, the optical signals propagating through the optical fiber 9 may be output at the point where the drawing of the optical fiber starts. In this case, since the optical fiber 9 is wound around the bobbin 930, the starting point of drawing of the optical fiber 9 is located at a given point on the bobbin 930. Therefore, optical signals emerging from the starting point of drawing of the optical fiber 9 that is rotating together with the bobbin 930 can be extracted via an optical rotary joint, for example. Alternatively, the de-multiplexer and two photodetectors of the phase detector unit may be fixed to the bobbin 930, and electrical signals output from the photodetectors may be extracted via a slip ring and a graphite brush. Further, it is possible that a radio transmitter as well as the de-multiplexer and the two photodetectors of the phase detector unit is fixed to the bobbin 930 and signals output from the photodetectors are converted into radio signals by the radio transmitter to be output by radio communication.

In the case where the optical signals emerging from the starting point of drawing of the optical fiber 9 are caused to enter the phase detector unit, the length L of the optical fiber 9 increases as the drawing time increases. Therefore, in this case, the arithmetical circuitry determines a cumulative chromatic dispersion DL(t) at a time "t", calculates a difference between the cumulative chromatic dispersion DL(t) and a cumulative chromatic dispersion DL(t−Δt) at a time (t−Δt) that is preceding the time t by a time Δt, and determines a drawing length ΔL during the time Δt. By dividing the difference (DL(t)−DL(t−Δt)) by the drawing length ΔL, the chromatic dispersion of the optical fiber 9 at each position can be obtained, and the distribution of chromatic dispersion in the longitudinal direction of the optical fiber 9 can be obtained.

What is claimed is:

1. A chromatic-dispersion measuring method for measuring chromatic dispersion in an optical fiber, comprising the steps of:

causing intensity-modulated optical signals having a plurality of different wavelengths to simultaneously enter the core portion of said optical fiber;

de-multiplexing and receiving the optical signals output from said optical fiber; and detecting the phase difference between the received optical signals, and measuring the chromatic dispersion of said optical fiber on the basis of the detection result, wherein said optical fiber is being drawn from an optical fiber preform, and said intensity-modulated optical signals are caused to enter an upper end of said optical fiber preform and then enter said optical fiber through said optical fiber preform.

2. A chromatic-dispersion measuring method for measuring chromatic dispersion in an optical fiber, comprising the steps of:

causing intensity-modulated optical signals having a plurality of different wavelengths to simultaneously enter the core portion of said optical fiber;

de-multiplexing and receiving the optical signals output from said optical fiber; and detecting the phase difference between the received optical signals, and measuring the chromatic dispersion of said optical fiber on the basis of the detection result, wherein said optical fiber is being drawn from an optical fiber preform, and said intensity-modulated optical signals are caused to enter said optical fiber from a side face of said optical fiber.

3. A chromatic-dispersion measuring method for measuring chromatic dispersion in an optical fiber, comprising the steps of:

causing intensity-modulated optical signals having a plurality of different wavelengths to simultaneously enter the core portion of said optical fiber;

de-multiplexing and receiving the optical signals output from said optical fiber; and detecting the phase difference between the received optical signals, and measuring the chromatic dispersion of said optical fiber on the basis of the detection result, wherein said optical fiber is being drawn from an optical fiber preform, and the optical signals emerging from a side face of said optical fiber are de-multiplexed and received.

\* \* \* \* \*